US00RE37811E

(19) United States
(12) Reissued Patent
Sitbon et al.

(10) Patent Number: US RE37,811 E
(45) Date of Reissued Patent: Jul. 30, 2002

(54) DISTRIBUTED APPLICATION LOAD DISTRIBUTION AID TOOL

(75) Inventors: Gerard Sitbon; Francois Urbain, both of Paris; Therese Saliba, Montigny-le-Bretonneux, all of (FR)

(73) Assignee: Bull S.A., Louveciennes (FR)

(21) Appl. No.: 09/614,223

(22) PCT Filed: Nov. 17, 1995

(86) PCT No.: PCT/FR95/01514

§ 371 (c)(1),
(2), (4) Date: Aug. 6, 1997

(87) PCT Pub. No.: WO96/17297

PCT Pub. Date: Jun. 6, 1996

Related U.S. Patent Documents

Reissue of:
(64) Patent No.: 5,993,038
Issued: Nov. 30, 1999
Appl. No.: 08/836,483
Filed: Aug. 6, 1997

(30) Foreign Application Priority Data

Nov. 30, 1994 (FR) ..... 94 14386

(51) Int. Cl.[7] ..... G05B 15/00
(52) U.S. Cl. ..... 700/1; 700/2; 700/3; 700/4; 709/202; 709/226; 713/1; 345/762; 345/765; 345/774
(58) Field of Search ..... 700/1, 2, 3, 4, 700/226; 709/200, 201, 202, 317; 713/1; 712/4, 28; 379/112.05, 112.06, 24.06, 221.07; 345/762, 765, 774; 707/501.1

(56) References Cited

U.S. PATENT DOCUMENTS 5,339,392 A * 8/1994 Risberg et al. ..... 345/762
5,442,789 A * 8/1995 Baker et al. ..... 709/202
5,787,160 A * 7/1998 Chaney et al. ..... 379/112.06
5,790,789 A * 8/1998 Suarez ..... 709/105

FOREIGN PATENT DOCUMENTS

| | | | |
|---|---|---|---|
| JP | 62-308454 | * | 6/1989 |
| JP | 1-258166 | | 10/1989 |
| JP | 2-41535 | | 2/1990 |
| JP | 2-73437 | | 3/1990 |
| JP | 63-274741 | * | 5/1990 |
| JP | 5-73393 | | 3/1993 |
| JP | 4-23058 | * | 9/1993 |
| JP | 5-334161 | | 12/1993 |
| JP | 4-63771 | * | 1/1994 |
| JP | 4-286681 | * | 4/1994 |

OTHER PUBLICATIONS

Journal of Parrallel and Distributed Computing, vol. 18, No. 1, May 1993, Duluth, MN US, pp. 1–13.*

(List continued on next page.)

*Primary Examiner*—Ramesh Patel
(74) *Attorney, Agent, or Firm*—John C. Kerins; Miles & Stockbridge P.C.

(57) ABSTRACT

A tool at the service of a distributed application running on machines of a distributed data processing system running in a local area network, intended for balancing the load on each of the machines of the system, includes a master daemon and a plurality of agent demons. The master and each of the agents calculate the load of the machine on which they are running. The master collects the load data of each of the agents at a first sampling interval and sends that collected load data to all of the agents. At the request of the distributed application, the local agent closest to the application indicates to the application which machine has the lightest load. The application then makes the decision to request the machine with the lightest load to execute the services the application requires. As necessary, the tool selects a master from the agents, thereby ensuring the existence and uniqueness of a master at all times, regardless of failure affecting one 1010 or more machines in the data processing system.

19 Claims, 1 Drawing Sheet

OTHER PUBLICATIONS

Jian Xu: "Heuristic Methods for Dynamic Load Balancing in a Message–Passing Multicomputer" see p. 2, left col. line 12–14; figure 1; p. 2, right col., line 33—page 3, right col., line 36; p. 4, left col., line 33—right col. line 6 ; page 5, left col.*

IEE Transactions on Software Engineering, vol. 15, No. 11, Nov. 1989, New York, US, pp. 1444–1458.*

M. Theimer et al.: "Finding Idle Machines in a Workstation–Based Distributed System" see p. 1446, right column, line 52—p. 1447, left col., line 1, see p. 1451, right col., line 15—p. 1452, left col., line 5.*

* cited by examiner

DISTRIBUTED APPLICATION LOAD DISTRIBUTION AID TOOL

Matter enclosed in heavy brackets [ ] appears in the original patent but forms no part of this reissue specification; matter printed in italics indicates the additions made by reissue.

The present invention relates to a toolkit for balancing the load of an application distributed among several machines belonging to a distributed data processing system in a local area network.

FIELD OF THE INVENTION

The current trend in the development of data processing systems is to form a data processing system through the association of a plurality of machines connected to one another through a network for example a local area network. Any user can run applications of widely varied types on this set of machines. These applications call services which supply the information required to handle the problem or problems they are working on, which are offered by all or some of these machines.

When an application in the process of running requires the use of a particular service, in current practice, it proceeds in the following manner:

- either it chooses, in a purely random manner, the machine which will provide it with this service and assigns the work to this machine,
- or it makes a circular choice among all the machines, which means that it assigns by turns, always in the same chronological order, the work of providing the services it requires in succession: thus, if the system has three machines, it assigns the work of providing the services it requires first to machine No. 1, those it requires second to machine No. 2, those it requires third to machine No. 3, and so on in the following order: No. 1, No. 2, No. 3, No. 1, etc.

No matter which of the two cases described above applies, none of the work of any of the machines is optimized in terms of time, and the capabilities of these machines in terms of speed and performance are used only at a level far below their maximum.

There are some known solutions which make it possible to eliminate these drawbacks: one of these is described in French patent application No. 94 08764, filed Jul. 13, 1994 by the Assignee of the subject application, under the title "Open Data Processing System with Multiple Servers". In a system of this type, formed by the association of a central system called a client with several servers, each server calculates its own load based on the criteria specific to each application running on the client, as well as its foreseeable development over time, and transmits these two factors to the client. The latter, when a particular application requires the services of a server, chooses the one with the lightest load during the period of time in which the services must be rendered and assigns it the work of supplying the services requested.

SUMMARY OF THE INVENTION

The present invention constitutes an improvement and a generalization of the preceding solution.

According to the invention, the tool at the service of a distributed application running on the machines of a distributed data processing system in a local area network, which is intended for balancing the load on each of these machines, is characterized in that it comprises a plurality of data processing modules called DAEMONs which run on these machines, one of which is called the master, the others being agents,

- the master and the agents each having means for calculating the load of the machines on which they are running, at first predetermined sampling instants, and means for storing the load data of the master and the agents,
- the master containing:
  - means for collecting the load data of each agent, at second predetermined sampling instants,
  - means for sending the load data of each agent to all of the other agents,
- each agent containing:
  - means for receiving the load data of the other agents,
  - the local agent closest to the application indicating to the latter, at the request of the latter, the machine with the lightest load, the application then making the decision to request this machine to execute the services it needs.

BRIEF DESCRIPTION OF THE DRAWING

Other characteristics and advantages of the present invention will become apparent from the following description given as a non-limiting example in reference to the appended drawings. In these drawings.

DESCRIPTION OF THE PREFERRED EMBODIMENTS

1) ESSENTIAL CHARACTERISTICS OF THE TOOL ACCORDING TO THE INVENTION

Figure 1:
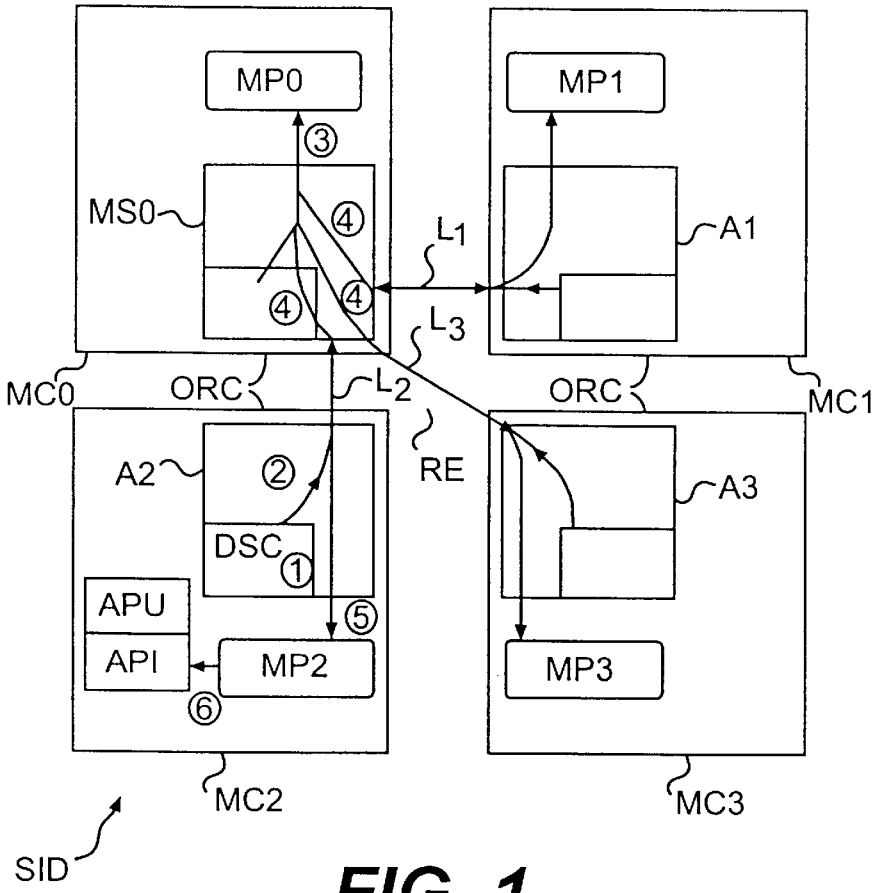
FIG. 1 shows a distributed data processing system which includes the load balancing toolkit according to the invention.

A) Structure:

The various essential characteristic elements of the load balancing toolkit ORC for (load balancing toolkit, in English) (load balancing toolkit, in English) in a distributed data processing system according to the invention—for simplicity's sake, from this point forward, it will be called the "toolkit"—appear in FIG. 1.

As shown in FIG. 1, the distributed data processing system, which can be any type whatsoever, here called SID, comprises four data processing machines of any size and shape whatsoever, namely MCO, MC1, MC2, MC3. Each of these machines—small-, medium, or large-scale computers—comprise the usual elements, namely one or more central processor unit, called CPU, memories associated with the latter, input/output units (I/O units,) and means for connecting to the network RE. These means are symbolically represented by two-way arrows which represent the data links between the four machines MCO through MC3 in FIG. 1.

The toolkit ORC itself comprises the master MS0 and the three agents A1, A2, A3. Any agent can also be a master, depending on conditions which will be explained below. Both the master and the agents are constituted by data processing tools known to one skilled in the art as DAEMONs. A DAEMON is a data processing tool or entity running on a machine, which is capable of responding to a question.

Inside each of the machines MCO through MC3, the DAEMONs MS0, A1, A2, A3 are respectively associated with shared memories MPO, MP1, MP2, MP3. Each of them contains the load of the corresponding machine, but also the loads of the other machines in SID.

FIG. 1 assumes that the distributed application is running on the machine MC2 and that it requires services supplied by the other machines MCO, MC1, MC3. This application is designated APU. The places where the master and the agents are located are independent from the place where APU is running.

B) Operation:

The following are the main lines of operation of the tool ORC, it being understood that during the establishment of communication between all the machines in the system SID, it is assumed to be established that MS0 is the master and that A1, A2, A3 are the agents. Refer again to FIG. 1, and specifically to the arrows and the circled numbers which accompany them, which respectively indicate the direction of the information flowing between the master and the agents, and the sequence of operations.

OPERATION 1: Each agent as well as the master collects, for the machine on which it is running, at given time intervals which constituted the first determined sampling instants ti, the load data of this machine, for each of the elements which constitute it (the CPU load, the loads of the associated memories, the loads of the I/Os, the network load, etc.). From the load of each element, expressed as a percentage of its maximum allowable load, the total load of the machine in question is calculated. This is accomplished by load calculation means, respectively MCC0 for MS0, MCC1 for A1, MCC2 for A2, MCC3 for A3. These means are simply constituted by calculation programs which implement the load calculation method described below, in paragraph 2: "Method for load calculation by each of the agents."These means are naturally an integral part of the master and of each agent, MS0, A1 through A3 and for this reason they are not represented per se in FIG. 1, for simplicity's sake. Once the total load of the machine in question is calculated a set of statistical data on the load of this machine, namely DSC, is obtained. In FIG. 1, this operation is shown for the agent A2 only, obviously for the purpose of preserving the clarity of this figure.

OPERATION 2: At regular intervals, the agents send MS0 the statistical load data from the corresponding machine, through the network (for A2, through the link L2 between MC2 and MC0).

OPERATION 3: The master MS0 centralizes, at practically the same regular intervals defined for Operation 2, which constitute the second determined sampling instants Ti, all the statistical load data of all the agents, as well as its own, at the level of its associated shared memory, in this case MP0. This centralization is in fact an operation for collecting the load data. It is therefore executed by load data collection means, respectively MRC0 for MS0, MRC1 for A1, MRC2 for A2, MRC3 for A3, which are in fact collection programs integrated into the master and into each of the agents A1 through A3 and are therefore not represented in FIG. 1 for simplicity's sake.

OPERATION 4: The master MS0 sends, using sending means MTCO, all this data to each agent A1, A2, A3 through the network RE, namely through the links L1 between MC0 and MC1, L2 between MC0 and MC2, L3 between MC0 and MC3, MTC0 is an integral part of MS0 and is therefore not represented in FIG. 1 for simplicity's sake.

OPERATION 5: Each agent receives this load data and copies it into its associated shared memory. MP1 for A1, MP2 for A2, MP3 for A3. This is accomplished by the means MRCC1 through MRCC3 for A1 through A3 respectively, which means are integral parts of the latter and are not represented in FIG. 1 for simplicity's sake.

OPERATION 6: The application APU scans the shared memory of the machine on which it is running to search it for the load estimated for each of the machines, and at the moment it needs the determined services to be rendered, it deduces the machine with the lightest load at this moment and requests the latter to render it these services.

2) METHOD FOR LOAD CALCULATION BY EACH OF THE AGENTS:

Examples of loads on the CPU, memory, Input/Output, and network RE elements are described below.

The description of the method for load calculation by each of the means MCCO through MCC3 is given in reference to Tables 1 through 4, which appear below and in which the loads are given as percentages.

TABLE 1

Sample load data stored in any shared memory associated with an agent (expressed as a %)

| | t1 | t2 | t3 | t4 | t5 | t6 | t7 |
|---|---|---|---|---|---|---|---|
| CPU load (W1) | 35 | 12 | 42 | 73 | 92 | 65 | 33 |
| Memory load (W2) | 45 | 32 | 33 | 67 | 46 | 32 | 40 |
| Network load (W3) | 12 | 6 | 33 | 20 | 12 | 38 | 5 |
| Input/output load (W4) | 25 | 30 | 56 | 46 | 78 | 44 | 32 |

TABLE 2 synthesis of series of global load data for each machine

| | t1 | t2 | t3 | t4 | t5 | t6 | t7 |
|---|---|---|---|---|---|---|---|
| MC0 | 56 | 32 | 67 | 63 | 79 | 82 | 54 |
| MC1 | 23 | 34 | 45 | 56 | 67 | 62 | 79 |
| MC2 | 32 | 38 | 34 | 42 | 35 | 32 | 36 |
| MC3 | 96 | 94 | 79 | 82 | 74 | 79 | 68 |

TABLE 3 extrapolation of the value of the global load after a time T for each machine

| | t1 | t2 | t3 | t4 | t5 | t6 | t7 | t8 = t7 + T |
|---|---|---|---|---|---|---|---|---|
| MC0 | 56 | 32 | 67 | 63 | 79 | 82 | 54 | estimated 73 |
| MC1 | 23 | 34 | 45 | 56 | 67 | 62 | 79 | estimated 82 |
| MC2 | 32 | 38 | 34 | 42 | 35 | 32 | 36 | estimated 36 |
| MC3 | 96 | 94 | 79 | 82 | 74 | 79 | 68 | estimated 73 |

TABLE 4 application of the power coefficient, comparison and selection

| | MC0 | MC1 | MC2 | MC3 |
|---|---|---|---|---|
| Estimated capacity | 73 | 82 | 36 | 76 |
| Power coefficient | 2.5 | 2 | 0.8 | 1.5 |
| Coefficient of the available capacity (100 − estimated load) * power coefficient | 67.5 | 36 | 51.2 | 36 |

The calculation of the load for each agent and master is identical to that described in the above-mentioned patent. It is briefly summarized here.

The total load Wt of an agent (and also of the master) is obtained using the following formula:

$$Wt=k1*W1+k2*W2+k3*W3+k4*W4, \text{ in which:}$$

W1 is the percentage of the utilization of the central processor of the agent in terms of time, W2 is the percentage of the utilization of the memory of the agent, that is, the ratio between the storage capacity actually used and its total capacity, W3 is the percentage of the utilization of the network by the agent, that is, the ratio between the number of pieces of information sent and received by the agent and the maximum allowable rate in the network, W4 is the percentage of the utilization of the input/output units by the agent.

k1, k2, k3, k4 are specific weighting factors of the processor, the memory, the network, and the input/output units. Their sum is equal to 1. Their values depend on the nature of the application in the process of running, in this case APU on the machine MC2.

The loads W1, W2, W3, W4 are measured and Wt is calculated as shown in each of the tables in Appendix 1, at determined sampling instants t1, t2, t3, t4, t5, t6, t7, etc. of the period T (which are, in fact, the instants ti mentioned above in the description of Operation 1).

Table 1 gives an example of load data collected by any agent, for example A1, relative to the corresponding machine MC1, for all the instants t1 through t7. This data is, of course, stored in the shared memory MP1 of the machine MC1 on which A1 is running, before it is sent to MS0.

This table shows, for example, that W1 is equal to 35 at the instant t1, W2 to 67 at the instant t4, W3 to 38 at t6, W4 to 32 at t7, and so on.

A calculation program API associated with APU, which runs on MC2, then applies—for the load data of each agent and the master which, after the execution of Operation 3, is contained in the shared memory MP0 of MC0 associated with MS0—the weighting factors k1 through k4 specific to the corresponding machines for the application APU.

Thus Table 2 is obtained, which shows, for each of the machines MCO through MC4, the global load value Wt at the instants t1 through t7. Thus it may be seen that, for MC0, Wt is equal to 56 at the instant t1, 32 at t2, 67 at t3, etc. For MC1, Wt is equal to 23 at t1, 34 at t2, etc., and so on for the other machines.

The following step for calculating the load for all the machines consists of estimating, by extrapolation, using the known mathematical method of least error squares, the value of the estimated load Wt at the instant t8=(t7+T).

Thus, Table 3 is obtained. This table makes it possible to read, for example, that the estimated values of the loads of MCO through MC3 at this instant t8 are 73, 82, 36, and 76, respectively.

Next, a power coefficient Cp specific to each machine is applied to the total load of each machine in order to obtain its actual available capacity rate C1, using the formula:

$$C1=(100-Wt(estimated))*Cp$$

In effect, it is important to take into account the characteristics of each machine, given that this is a heterogeneous data processing environment wherein the power, the size and the type of the machines which compose it are different. Thus, if a machine has a light load but at the same time does not have enough processing power to provide the services requested of it by the application APU at a given moment, it is obvious that another machine must provide these services. Hence the necessity for a correction factor in order to define the load, and hence the existence of the power coefficient CP which corresponds to this purpose.

The coefficient Cp of a given machine is calculated by generating a synthesis of the power of the central processor CPU, the capacity of the memories, the processing power of the input/output units, etc. It is recalculated each time the hardware configuration of the machine is changed or its operating system is modified. Likewise, each time the general configuration of the distributed data processing system SID is changed, all the coefficients CP of all the machines in the system are redefined. A Cp equal to 1 corresponds to a medium-scale machine, which is defined by the user.

In Table 4, it is possible to read examples of actual available capacity rates C1 for each machine MCO through MC3. Thus, for MCO, with an estimated capacity rate of 73 and a power coefficient Cp of 2.5, the actual available capacity rate is 67.5. The same figures are respectively 82, 2, 36 for MC1, and so on for MC2 and MC3.

3) METHOD FOR SELECTING THE MASTER MS0:

The basic philosophy is that any DAEMON running on any machine can be a master. It is therefore important to develop a mechanism which makes it possible to define which one of them will be the master and the conditions for its selection, as well as the modalities for its replacement should it fail.

The selection mechanism must ensure that at least 1 DAEMON is running and that two of them cannot be masters simultaneously (especially if they start up at the same time).

It is composed of the following 5 main phases:

Phase 1: When a DAEMON starts up, it generates a unique identifier ID in conformity with the protocol used in the network RE, for example in conformity with the TCP-IP protocol used in the exemplary embodiment of the invention described herein. This identifier is composed of the Ethernet address (Ethernet is the part of the TCP-IP protocol related to local area networks and is used in the exemplary embodiment described herein. Ethernet being understood to be standardized and therefore known to one skilled in the art), the moment at which the identifier is transmitted, and a random value. At the same time, it puts itself into an intermediate state and sends these two pieces of information (its current state, ID) through the network RE to all the machines in the network.

Phase 2: it waits to receive the identical information from the other DEMONS, for determined a time interval Tr (on the order of 5 to 10 seconds). It is a candidate for the role of master.

Phase 3: As soon as it receives this information, it analyzes it.

If it comes from a DAEMON which is in fact a master, that is, considered to be MS0, it considers itself to be an agent.

If it comes from a DAEMON in an intermediate state, it compares its own identifier with the one it receives.

If its own identifier is lower than the one it receives, it retains the right to be the master MS0.

If its own identifier is higher than or equal to the one it receives, it cedes the position. It then retransmits the two pieces of information (its own ID, its state) and again waits for responses during the time interval Tr, also called the timer.

Phase 4: Once this time interval has elapsed, the DAEMON in question tries again. In order to avoid a loss of messages, which is always possible in the network RE, it uses the following procedure:

The transmission and the listening for responses are repeated 5 times.

If the DAEMON in question receives a response from another DAEMON which reveals itself to be an agent, it can be sure that a master MS0 exists and it waits for the response from the latter to reach it.

Phase 5: When 5 repetitions have taken place, and the DAEMON in question has not received any response from the other DAEMONs, it then decides that it is the master MS0.

When one of the three agents A1 through A3 realizes that the master MS0 is no longer communicating with it, it starts the procedure below in all its phases, which results in the choice of a new master chosen from among the three.

Moreover, the master periodically notifies all the machines in the system SID of its existence. If the master detects the existence of another master, the procedure is restarted by the one whose ID is lower.

Figure 2:
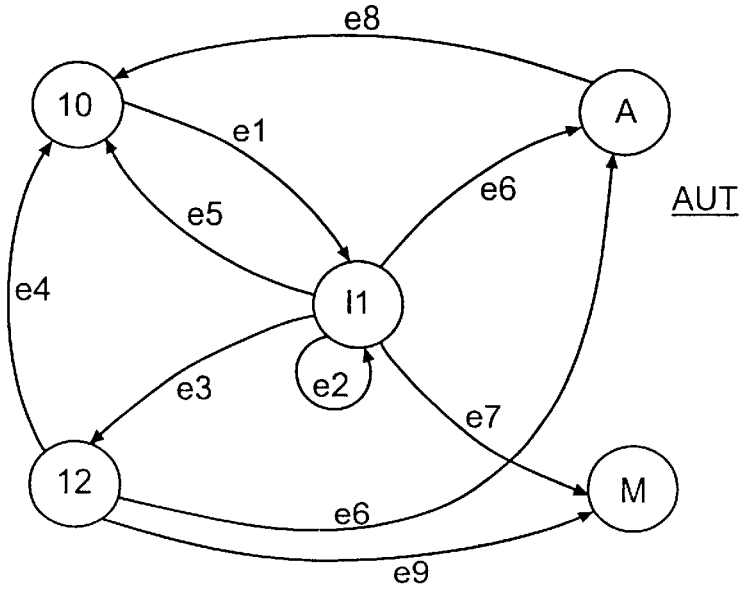
FIG. 2 shows the controller for distributing the master-agent roles among the various elements which constitute the load balancing toolkit according to the invention.

FIG. 2, which shows the controller AUT which distributes the master-agent roles among the various DAEMONs running on the machines of SID, will make it easier to understand the sequence of the different phases 1 through 5 described above.

This controller AUT comprises 5 states:

State IO: The DAEMON in question sends the two pieces of information (its own ID, its state), which corresponds to Phase 1.

State I1: This DAEMON listens for responses from the other DAEMONs, which corresponds to Phases 2 and 3.

State I2: This DAEMON waits for the time interval Tr to elapse, and for a possible response from the master MS0.

State A: The DAEMON in question becomes an agent A1, A2 or A3.

State M: The DAEMON in question becomes the master MS0.

The events which correspond to this controller, which are denominated e1 through e8, are the following:

e1: The DAEMON in question has disseminated its ID and its state and has set a time interval Tr.

e2: An ID is received, and the local identifier ID (that of the DAEMON in question) is lower than the identifier it receives.

e3: An ID is received, and the local ID is greater than or equal to the ID received.

e4: The time interval Tr has expired.

e5: The time interval Tr has expired and the number of attempts is less than 5, or an agent has just responded.

e6: The master has just responded.

e7: The time interval Tr has expired, the number of attempts is equal to 5, and no agent has responded.

e8: The connection with the master is lost.

e9: Detection by a master of the existence of another master with a higher ID.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

APPENDIX 1

TABLE 1

Sample load data stored in any shared memory associated with an agent (expressed as a %)

| | t1 | t2 | t3 | t4 | t5 | t6 | t7 |
|---|---|---|---|---|---|---|---|
| CPU load (W1) | 35 | 12 | 42 | 73 | 92 | 65 | 33 |
| Memory load (W2) | 45 | 32 | 33 | 67 | 46 | 32 | 40 |
| Network load (W3) | 12 | 6 | 33 | 20 | 12 | 38 | 5 |
| Input/output load (W4) | 25 | 30 | 56 | 46 | 78 | 44 | 32 |

TABLE 2 synthesis of series of global load data for each machine

| | t1 | t2 | t3 | t4 | t5 | t6 | t7 |
|---|---|---|---|---|---|---|---|
| MC0 | 56 | 32 | 67 | 63 | 79 | 82 | 54 |
| MC1 | 23 | 34 | 45 | 56 | 67 | 62 | 79 |
| MC2 | 32 | 38 | 34 | 42 | 35 | 32 | 36 |
| MC3 | 96 | 94 | 79 | 82 | 74 | 79 | 68 |

TABLE 3 extrapolation of the value of the global load after a time T for each machine

| | t1 | t2 | t3 | t4 | t5 | t6 | t7 | t8 = t7 + T |
|---|---|---|---|---|---|---|---|---|
| MC0 | 56 | 32 | 67 | 63 | 79 | 82 | 54 | estimated 73 |
| MC1 | 23 | 34 | 45 | 56 | 67 | 62 | 79 | estimated 82 |
| MC2 | 32 | 38 | 34 | 42 | 35 | 32 | 36 | estimated 36 |
| MC3 | 96 | 94 | 79 | 82 | 74 | 79 | 68 | estimated 73 |

TABLE 4 application of the power coefficient, comparison and selection

| | MC0 | MC1 | MC2 | MC3 |
|---|---|---|---|---|
| Estimated capacity | 73 | 82 | 36 | 76 |
| Power coefficient | 2.5 | 2 | 0.8 | 1.5 |
| Coefficient of the available capacity (100 − estimated load) * power coefficient | 67.5 | 36 | 51.2 | 36 |

We claim:

1. A tool (ORC) at the service of a distributed application (APU) running on machines (MC0 through MC3) of a distributed data processing system (SID) in a local area network (RE), intended for balancing a load on each of said machines, said tool comprising a plurality of data processing modules (MS0, A1 through A3) called DAEMONs which run on said machines, one of which is a master (MS0), the others being agents (A1 through A3), the master (MS0) and the agents (A1 thorough A3) having respective means (MCC0 through MCC3) for calculating at first determined sampling instants ti the load of the machines on which the DAEMONs are running and respective storage means (MP0 through MP3) for storing the load data of the master and the agents, the master (MS0) containing:

means (MRC0 through MRC3) for collecting load data of the respective agents at second determined sampling instants Ti, means (MTC0) for sending the load data of each agent to all of the agents, each agent (A1 through A3) containing:

respective means (MRCC1 through MRCC3) for receiving the load data of the other agents, whereby at a request of the application the [local agent] *DAEMON* closest to the application indicates to the application which machine has the lightest load, the application then making the decision to request said machine with the lightest load to execute services the application requires[.] *each machine comprising a state machine (AUT) for choosing a master from among the DAEMONs for ensuring existence and uniqueness of said chosen master at start-up of said DAEMONs and after loss of the chosen master during the execution of the tool (ORC), each state machine generating a DAEMON state (master, slave) of the DAEMON which is running on the respective machine, said DAEMON state being a function of information received from all other DAEMONs which are running on other machines.*

[2. The tool according to claim 1, further comprising selection means (AUT) for choosing a master from the DAEMONs, which ensures the existence and the uniqueness of said master at the start-up of said DAEMONs and after loss of a master during the execution of the tool (ORC).]

3. The tool according to claim 1, further comprising means (AUT, e8) for ensuring continuity of the service rendered to the application by the tool in case of a failure affecting at least one machine in the data processing system.

4. The tool according to claim 1, [further comprising means (AUT, e1, State I0)] *wherein each machine (MC0 through MC3) comprises (AUT, e1, State I1)* for automatically [detecting] *receiving* from the network [which machines will allow the network to retrieve] the addresses of all the machines at the start-up of the DAEMONS.

5. A process for implementing a tool at the service of a distributed application (APU) running on machines of a data processing system including data processing modules (MS0, A1 through A3) called DAEMONs which run on said machines, one of which is a master (MS0), the others being agents (A1 through A3) the process comprising,

*1) choosing a master from among the DAEMONs for ensuring existence and uniqueness of said chosen master at start-up of said DAEMONs and after loss of the chosen master during the execution of the tool (ORC), each state machine generating a DAEMON state (master, slave) of the DAEMON which is running on the respective machine, said DAEMON state being a function of information received from all other DAEMONs which are running on other machines,*

[1)] *2)* Collecting load data for the machines at first time intervals ti on which the applications are running, and calculating the total load of each machine from said load data and from its power;

[2)] *3)* At second time intervals Ti, sending the load data from agent data processing modules (A1 thorough A3) of the corresponding machines to a master data processing module;

[3)] *4)* At said second intervals Ti, centralizing the load data of the agents and the master using collection means (MRC0 through MRC3);

[4)] *5)* Sending all of said data to each agent (A1 through A3);

[5)] *6)* Copying all said load data from each agent into an associated shared memory (MP1 through MP3), and

[6)] *7)* At the moment at which the application (APU) estimates it will need a particular service to be rendered to it, searching in shared memory (MP0 through MP3) of the machine on which the application (APU) is running for the estimated load of each of the machines (MC0 through MC3), deducing the machine with the lightest load at this moment, and then requesting said machine to render the service the application requires.

6. A process for implementing a tool at the service of a distributed application APU) runninig on machines of a data processing system including data processing modules (MS0, A1 through A3) called DAEMONs which run on said machines, one of which is a master (MS0), the others being agents (A1 through A3), the process comprising:

*1) choosing a master from among the DAEMONs for ensuring existence and uniqueness of said chosen master at start-up of said DAEMONs and after loss of the chosen master during the execution of the tool (ORC), each state machine generating a DAEMON state (master, slave) of the DAEMON which is running on the respective machine, said DAEMON state being a function of information received from all other DAEMONs which are running on other machines,*

[1)] *2)* collecting load data for machines on which the agents and the master (MS0, A1 through A3) are running, at first time intervals ti;

[2)] *3)* calculating a total load of a respective machine from said data and from the respective machine's power;

[3)] *4)* sending the master (MS0) via the respective agents (A1 through A3), at second time intervals Ti, the load data of a respective machine;

[4)] *5)* centralizing load data of all the agents as well as load data of the master (MS0) via the master (MS0), at said second time intervals Ti;

[5)] *6)* sending all of said centralized load data to each agent (A1 through A3) via the master (MS0);

[6)] *7)* copying all said centralized load data into respective shared memories (MP1 through MP3) by each agent (A1 through A3); and

[7)] *8)* performing the following steps by the application (APU) at a moment at which the application (APU) estimates the application will need a particular service to be rendered:

a) searching a shared memory (MP0 through MP3) of a machine on which the application (APU) is running for an estimated load of each of the machines (MC0 through MC3), b) deducing a machine with the lightest load at said moment, and c) requesting said machine with the lightest load to render the application (APU) said service.

7. The invention as set forth in claim 6 wherein the step of calculating a total load is performed by a calculation program.

8. The invention as set forth in claim 7 wherein the step of centralizing load data is performed by a collection program.

9. The invention as set forth in claim 7 wherein the step of sending all of said centralized load data is effected by an integral part (MTC0) of said master (MS0).

10. The invention as set forth in claim 8 wherein the step of sending all of said centralized load data is effected by an integral part (MTC0) of said master (MS0).

11. The invention as set forth in claim 9 wherein the step of sending all of said centralized load data is effected by an integral part (MTC0) of said master (MS0).

12. The invention as set forth in claim 9 wherein the step of sending all of said centralized load data is effected by an integral part (MTC0) of said master (MS0).

13. The invention as set forth in claim 6 wherein the step of centralizing load data is performed by a collection program.

14. The invention as set forth in claim 13 wherein the step of centralizing load data is performed by a collection program.

15. The invention as set forth in claim 13 wherein the step of sending all of said centralized load data is effected by an integral part (MTC0) of said master (MS0).

16. The invention as set forth in claim 14 wherein the step of sending all of said centralized load data is effected by an integral part (MTC0) of said master (MS0).

17. The invention as set forth in claim 6 wherein the step of sending all of said centralized load data is effected by an integral part (MTC0) of said master (MS0).

18. The invention as set forth in claim 17 wherein the step of centralizing load data is performed by a collection program.

19. The invention as set forth in claim 17 wherein the step of sending all of said centralized load data is effected by an integral part (MTC0) of said master (MS0).

20. The invention as set forth in claim 18 wherein the step of sending all of said centralized load data is effected by an integral part (MTC0) of said master (MS0).

* * * * *